No. 836,841. PATENTED NOV. 27, 1906.
S. P. STOVALL.
AGRICULTURAL IMPLEMENT.
APPLICATION FILED MAY 31, 1905.

4 SHEETS—SHEET 1.

Witnesses
Inventor
Sidney Pennington Stovall
by Henry N. Copp
his Attorney

No. 836,841. PATENTED NOV. 27, 1906.
S. P. STOVALL.
AGRICULTURAL IMPLEMENT.
APPLICATION FILED MAY 31, 1905.

4 SHEETS—SHEET 2.

No. 836,841. PATENTED NOV. 27, 1906.
S. P. STOVALL.
AGRICULTURAL IMPLEMENT.
APPLICATION FILED MAY 31, 1905.
4 SHEETS—SHEET 3.

Witnesses
Milton C. Lenoir
Geo. R. Hamlin

Inventor
Sidney Pennington Stovall
by Henry N. Cope
his Attorney

No. 836,841. PATENTED NOV. 27, 1906.
S. P. STOVALL.
AGRICULTURAL IMPLEMENT.
APPLICATION FILED MAY 31, 1905.
4 SHEETS—SHEET 4.
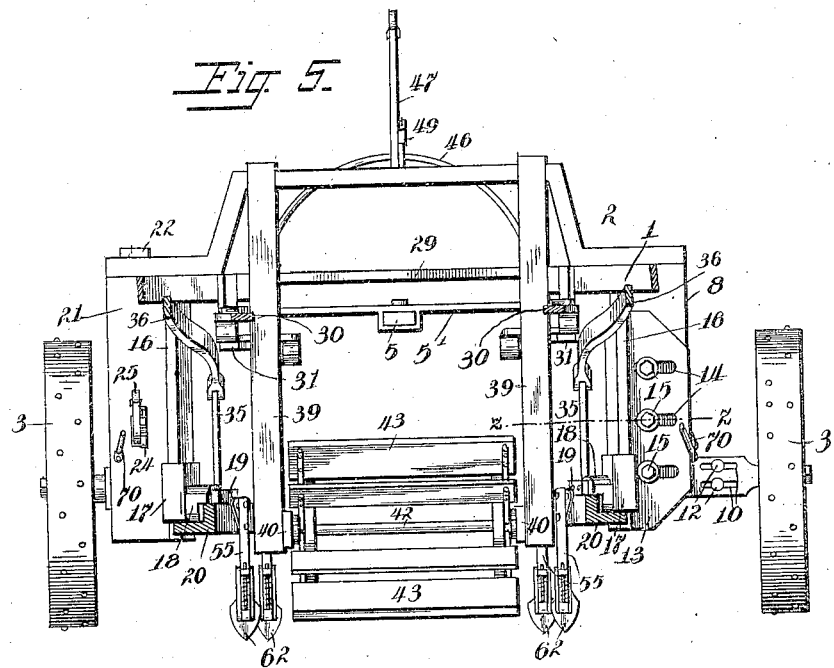
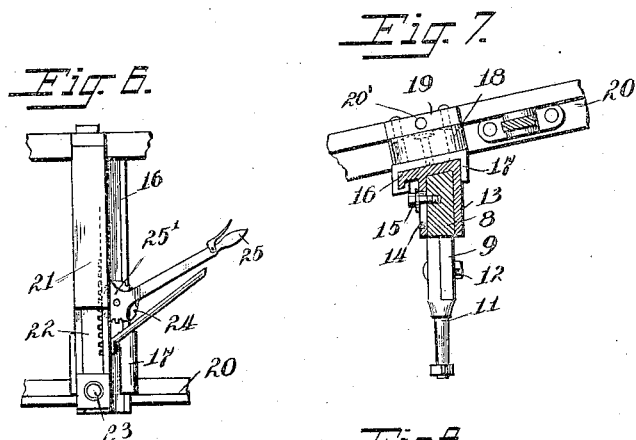
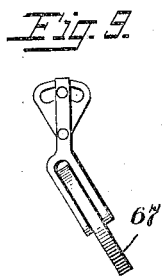
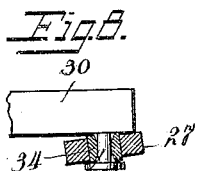
Witnesses
Milton C Lenoir
Geo. R Hamlin
Inventor
Sidney Pennington Stovall
by Henry N Copp
his Attorney
THE NORRIS PETERS CO., WASHINGTON, D. C.

UNITED STATES PATENT OFFICE.

SIDNEY PENNINGTON STOVALL, OF TRINIDAD, COLORADO.

AGRICULTURAL IMPLEMENT.

No. 836,841.            Specification of Letters Patent.            Patented Nov. 27, 1906.

Application filed May 31, 1905. Serial No. 263,072.

*To all whom it may concern:*

Be it known that I, SIDNEY PENNINGTON STOVALL, a citizen of the United States, residing at Trinidad, county of Las Animas, and State of Colorado, have invented certain new and useful Improvements in Agricultural Implements, of which the following is a specification.

My invention relates to agricultural implements, and especially to cultivators.

One object of the invention is the provision of means whereby the device may be utilized for several different independent uses.

Another object is the provision of novel means whereby the supporting-wheels may be adjusted to raise or lower the machine to allow for the unevenness of the ground on which the machine is being used.

Another object of the invention is to provide novel means which when operated will so adjust the cultivator-beams as to make them cover different widths of ground or to cultivate an entire swath or to straddle a row.

A further object is the provision of novel means whereby the cultivators may be raised so as to make them inoperative as is needed when passing over points which it is not desired to cultivate, and, further, means to hold them in their adjusted positions.

Still further objects will appear to those versed in this art when the specification which follows is read in connection with the accompanying drawings, which form a part of this application, and in which—

Figure 1:
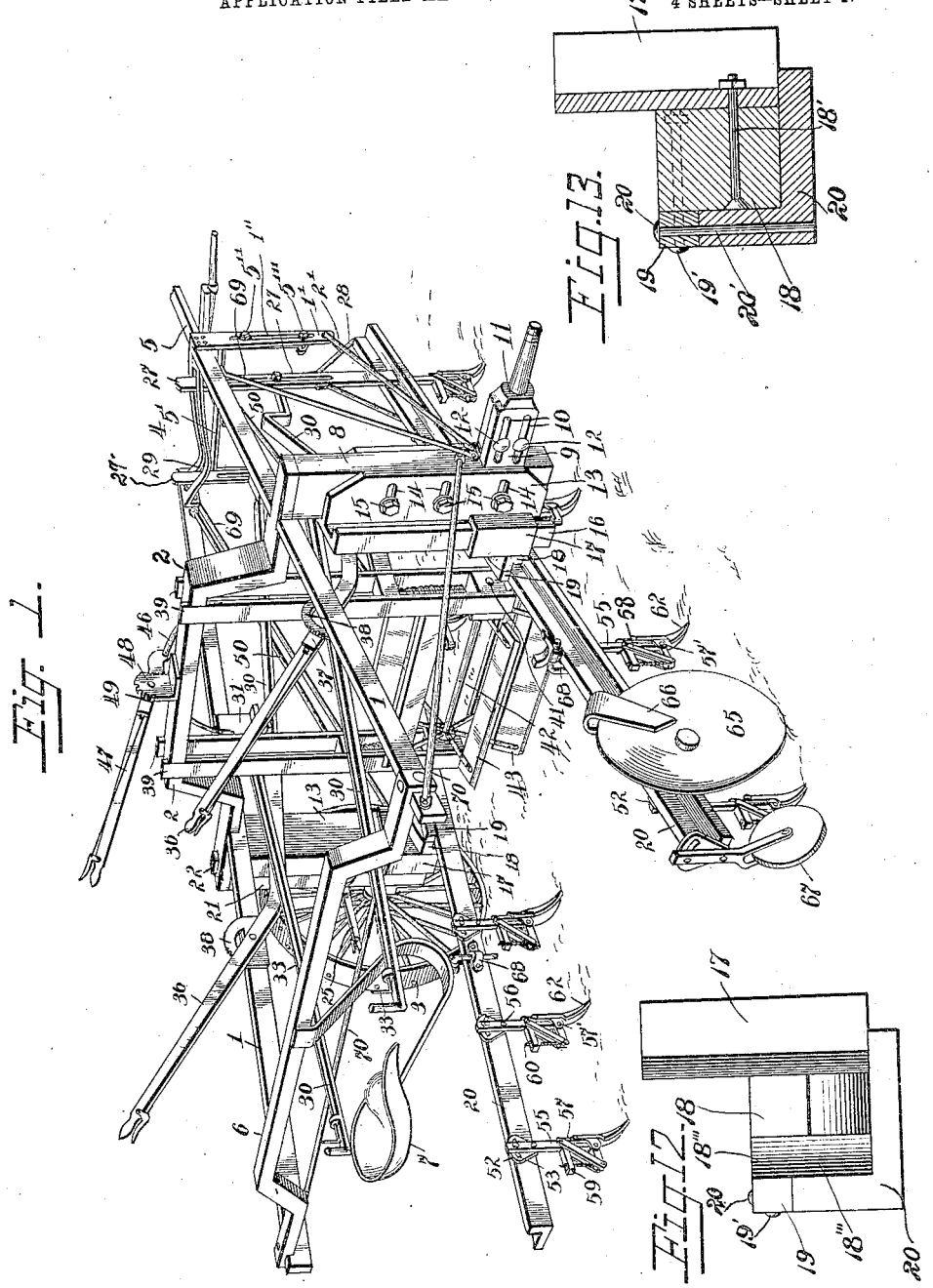
Figure 2:
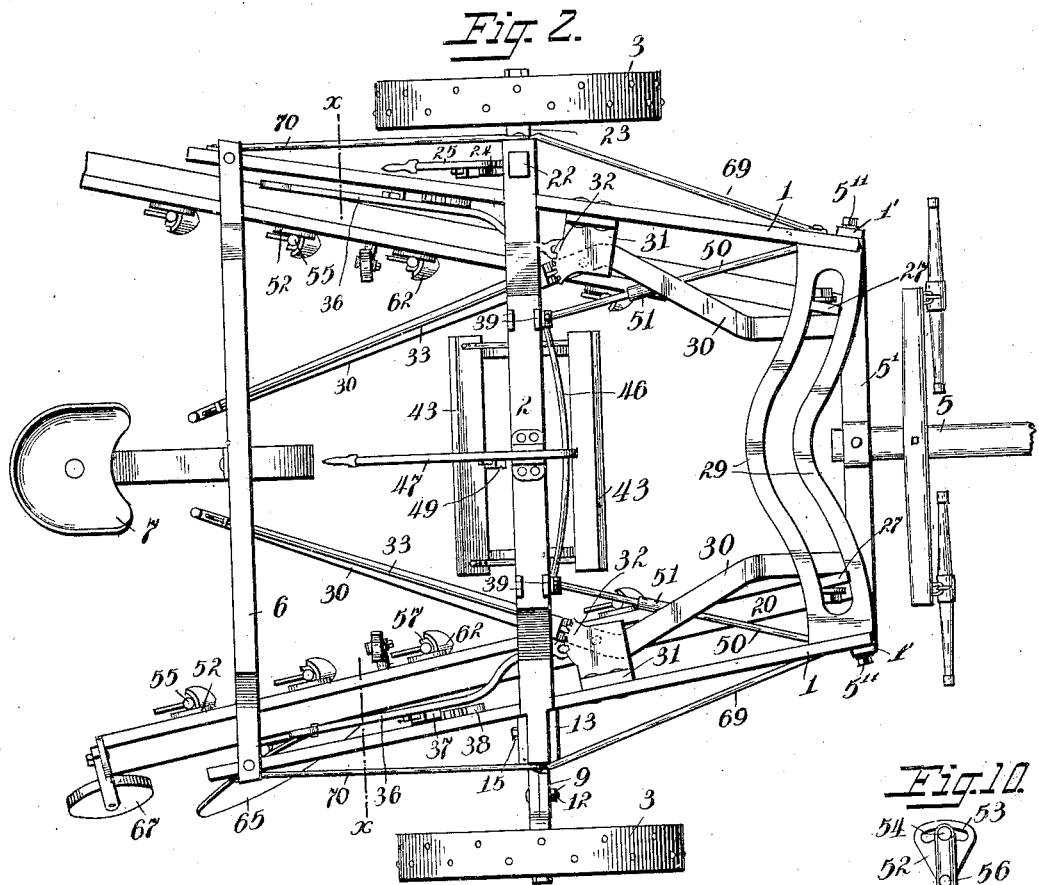
Figure 3:
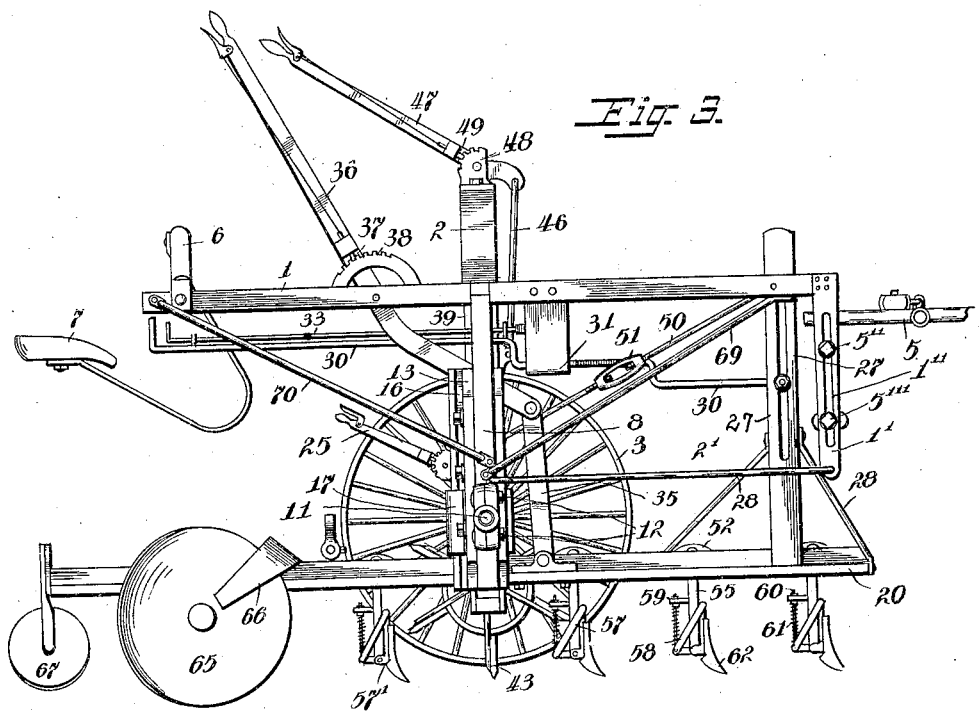
Figure 4:
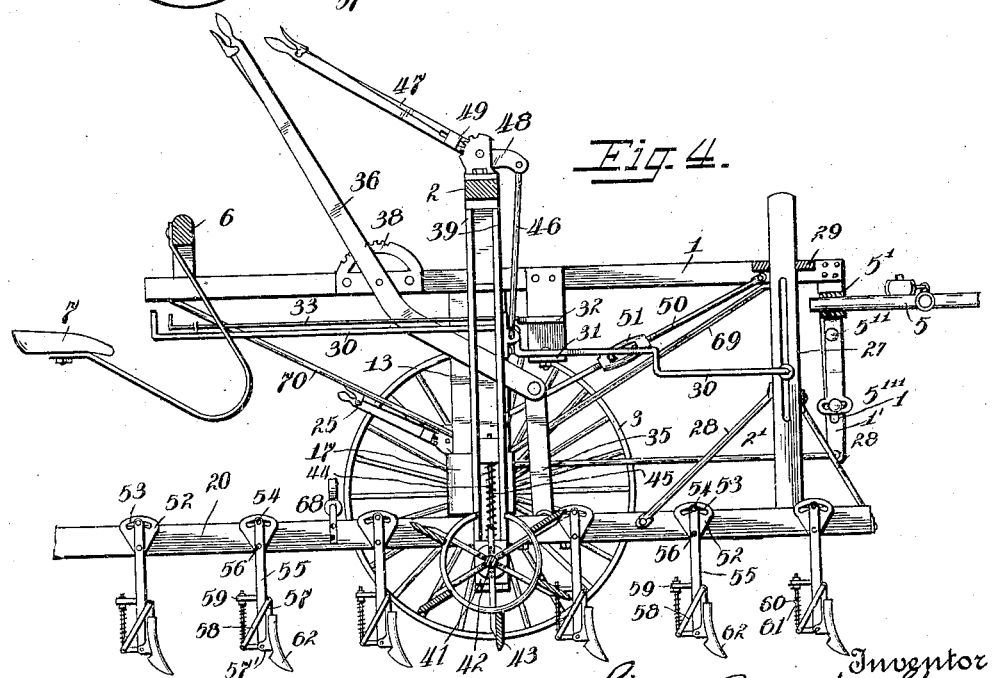

Figure 1 is a rear perspective of the entire machine. Fig. 2 is a plan view. Fig. 3 is a side elevation with one of the supporting-wheels removed. Fig. 4 is a central longitudinal section. Fig. 5 is a cross-section taken on the line *x x* of Fig. 2. Fig. 6 is a detail side elevation of the right-hand axle and its adjusting means. Fig. 7 is a detail section taken on line *z z* of Fig. 5. Fig. 8 is a detail, partly in section, of the connection between the plow-beam-swinging lever and its guiding member. Fig. 9 is an enlarged detail of the guiding-wheel which is attached to the rear of the plow-beams and showing its manner of adjustment. Fig. 10 is an enlarged view of the preferred form of cultivator which shows the manner of operation. Fig. 11 is a modification of the cultivator shown in Fig. 10; and Figs. 12 and 13, an enlarged end view and a vertical cross-section, respectively, of the pivotal connections for the plow-beams.

Referring more especially to the drawings, 1 1 represent the side beams of the frame, which are secured to the bowed central cross-beam 2, which is supported by the supporting-wheels 3 3 in a peculiar manner, which will be hereinafter described. At the forward ends of the side beams 1 1 are secured slotted depending beams 1', braced by rods 2'. The draft pole or tongue 5 is secured to the cross-piece of a U-shaped draft member 5', adjustably connected to the beams 1' by bolts 5'' and 5''', which permit up-and-down and tilting adjustment of the member 5', slots 1'' being provided in beams 1'.

In changing the machine from a cultivator to a breaking-plow or a harrow the draft member is reversed or turned upside down, thus lowering the draft pole or tongue 5 very considerably to suit the different use of the machine.

Depending from the right-hand side of the central cross-beam 2 is a column 8, and integral therewith is an arm 9, which extends out at right angles to the column 8 and is provided with a pair of longitudinal slots which are adapted to mate with similar slots 10 in the stub-axle 11. Bolts 12 pass through the slots in the arm 9 and those in the axle 11 and allow the axle to be adjusted so that the supporting-wheel 3 on that side may be inclined angularly in either direction or shoved farther out to widen the tread. Secured to slide laterally or vertically on the column 8 is a three-sided box 13, which is provided with a series of slots 14, adapted to receive bolts 15, which are screwed into the column 8. The box 13 is provided with an L-flange 16, which holds a sleeve 17, slidably mounted on the box. Pivotally attached by bolt 18' to the sleeve 17 is a block 18, and to the block 18 is rigidly secured by bolts 19' another block 19, which is in turn swiveled by vertical bolt 20' to the plow-beam 20 of that side of the machine. The block 18 is peculiarly constructed, it being rounded off on the bottom 18'' toward each end and again rounded off toward each end at 18' on the side adjacent the block 19, as shown in Figs. 12 and 13. (See also dotted lines in Fig. 7.) This construction allows the plow-beam 20 to swing laterally and vertically when necessary.

Rigidly secured to the left-hand side of the central cross-beam 2 and depending therefrom is a box 21, similar to the one on the column 8, but closed on its outer side for a part of its length. This box is provided with an L-flange, sliding sleeve, and blocks similar to parts 16, 17, 18, and 19, and said parts operate in substantially the same manner as the parts on the opposite side. Slidably mounted in the box 21 is a rack-bar 22, which carries an integral axle 23, movable therewith, on which is adapted to rotate the supporting-wheel 3. Pivotally mounted on a toothed segment 24, which is rigidly secured to the box 21, is a lever 25, provided with a semicircular toothed portion 25', adapted to engage the teeth of the rack-bar 22, so that the supporting-wheel 3 may be raised or lowered. The lever is provided with the usual pawl to engage teeth of the segment 24, and thereby hold the wheel in its raised or lowered position.

Extending up from the forward end of each plow-beam 20 20 are slotted uprights 27, which are properly braced by braces 28 and which pass through a slotted guiding member 29, secured to the side bars 1 1 and which is curved in an arc struck from the points 20', where the plow-beams 20 are swiveled to blocks 19. Working loosely in the slots of the uprights 27 are operating-levers 30, which are pivoted to seats 31, secured to the side bars 1 1, which seats are provided with toothed segments 32, which are adapted to be engaged by pawls carried on the operating-levers 30. These operating-levers are peculiarly shaped, which will be noticed from inspection of Figs. 2, 3, and 4, and extend back to within reach of the operator. When the levers are operated, the pawls must be withdrawn from the segments 32 by the hand-rod 33 and forced away from the operator. This draws the forward ends of the plow-beams 20 together and throws their rearward ends apart, giving greater cultivating possibilities.

In the detail shown in Fig. 8 I have shown a rounded roller 34, which surrounds a pintle 34', projecting at right angles from the levers 30, which roller prevents any binding as the plow-beams are moved in and out, raised, or lowered.

Pivoted near the center of the plow-beams 20, just forward of their pivotal point with the block 19, are links 35, which in turn are pivoted to the outer or forward ends of levers 36. These levers 36 are pivoted to the side bars 1 1 and are each provided with a pawl 37, spring-pressed into engagement with a toothed segment 38, whereby they are held in adjusted position. By depressing the levers at their rearward ends the plow-beams 20 are raised, thus carrying the plow-points out of contact with the ground.

The vertically-sliding members 39 have bottoms 40, which support vertically-slidable journal-bearings 41, in which are journaled the ends of shaft 42 of a stalk and weed chopper 43. Springs 44 and rods 45 hold the bearings pressed downward. An arched member 46, lever 47, rack-bar 48, and pawl 49 are employed to raise the stalk-chopper.

The stalk-chopper and its associated parts are disclosed in detail and claimed in my application, Serial No. 278,468, filed September 14, 1905, as a division of the present application, and no claim thereto is made herein.

Braces 50 extend from the forward end of the side bars 1 1 to a point below the middle of the supporting members 39 and pass through slots. On the opposite side of the members 39 the braces are provided with headed ends, so that the members can slide up and down without interfering with the function of the braces or being disengaged therefrom. The braces are provided with turn-buckles 51, so that they may be tightened should this become necessary.

Extending along the entire length of the plow-beams at suitable intervals are adjustably secured cultivator-plows of peculiar construction, which is shown in Fig. 11 and which is worthy of a slight description.

52 designates a plate which is provided with an arc-shaped slot 53 in its upper portion, which is adapted to receive a bolt 54, secured to depending bar 55, which bar is pivoted at 56 to the plate 52, so that the bolt 54 may move in the slot 53. A nut (not shown) engages the bolt 54 and locks bar 55 in its adjusted position. Pivoted by arm 57' to the lower end of bar 55 is a shield 56', which is provided with an arm 57, and extending from the upper part of the shield 56' to the outer end of the arm 57 is a brace 58. Rigidly secured to the bar 55 at right angles is a bearing arm 59, through an aperture in which slides a rod 60, which is pivoted to the outer end of the arm 57'' and which is inclosed in a spiral spring 61, which is confined between the arm 59 and the arm 57'' and normally forces the arm 57'' downward and the shield up against the bar 55. When the plow-point 62, which is secured to the shield 56', comes in contact with an immovable object, it pulls the shield down and forces the arm 57'' and rod 60 upward against the action of the spring 61. When the plow-point passes the obstruction, the spring 61 returns it to operative position.

In Fig. 11 I have shown a modification of the cultivator-plows. The bar 55 has a bifurcated end 63, in which is journaled a disk 64 of common construction. When it is desired to use the machine for breaking ground, the cultivator-plows are removed and disk plows 65 are placed on the plow-beams 20, and scrapers 66 are provided to remove surplus collections of dirt thereon. I have only shown one of these plows as illustrating their application and use. When breaking-plows 65 are used, a guiding-wheel 67 is used on the rear end of the plow-beams, which is journaled in the bifurcated end of a bar similar to those supporting the cultivator-plows and is adjusted in the same manner.

To make the device more rigid, I have placed braces 69 and 70 from the forward and rearward ends of the side beams, respectively, to the column 8 on one side and to the box 21 on the opposite side.

A number of clips 68, only one of which is shown for illustration, may be placed along the plow-beams 20 on the inside and footrests adjustably screwed therein.

It will be clearly understood that the guiding-wheel 67 and the large disk 65 are to be used only when it is desired to use the machine as a sulky breaking-plow. When the machine is desired to be used for this purpose, the beams 20 are stripped of all other implements, and the disk 65 and the wheel 67 are placed in position. It will be understood that the disk 65 is only shown as an illustration. A mold-board or other plow may be used. When the farmer gets his land all broken, he removes the disk 56 (or the mold-board plow, whichever he is using) and the guiding-wheel 67 and uses in place thereof the disks shown in Fig. 11, four of which are used on each beam. The forward ends of the beams are then contracted, which makes the device a pulverizer. When the crop is out of the ground and it is ready for cultivation, the disks shown in Fig. 11 are removed or may be used instead of the cultivator-teeth shown in Fig. 10, six of which are placed upon each beam, and the forward ends of the beams are widened sufficiently to straddle the row of corn or other vegetable being cultivated. Therefore it will be seen that the farmer has at his command a sulky-plow, a pulverizer or harrow, and a cultivator.

Having thus described my invention, what I claim as new, and desire to secure by Letters Patent, is—

1. In a cultivator, the combination with a main frame, of forwardly and rearwardly extending cultivator-beams pivotally connected intermediate their ends to the main frame and having their forward ends swingingly adjustable toward and away from each other, whereby they may be brought to various angles of inclination laterally, and independent means capable of independent operation for independently swinging the forward end of each cultivator-beam toward the other cultivator-beam.

2. In a cultivator, the combination with a main frame, of forwardly and rearwardly extending cultivator-beams pivotally connected intermediate their ends to the main frame for lateral swinging of their forward and rearward ends toward and away from each other, whereby they may be brought to various angles of inclination laterally, independent means for independently swinging the ends of said cultivator-beams laterally toward and away from each other, and means for locking the respective cultivator-beams when adjusted laterally.

3. In a cultivator, the combination with a main frame, of forwardly and rearwardly extending cultivator-beams pivoted to the main frame intermediate their ends and independently swingingly adjustable laterally toward and away from each other, independent means for adjusting said cultivator-beams independently laterally to position them at various angles of inclination relatively to each other, and means for raising and lowering said cultivator-beams and securing them at desired heights.

4. In a cultivator, the combination with a main frame, of forwardly and rearwardly extending vertically-movable cultivator-beams pivoted to the main frame intermediate their ends and independently swingingly adjustable laterally toward and away from each other, independent hand-levers for swinging said beams laterally to position them at various angles of inclination relatively to each other, and independent hand-levers for independently raising and lowering said beams.

5. In a cultivator, the combination with a main frame, of a column, a box having slots, bolts passing through the slots and into the column, a cultivator-beam, and a sleeve connected to the cultivator-beam, and slidable up and down on the box.

6. In a cultivator, the combination with a main frame having a column, of a sleeve slidably connected to said column for up-and-down movement, and a cultivator-beam pivoted to the sleeve aforesaid, whereby the cultivator-beam can be raised and lowered or swung laterally.

7. In a cultivator, the combination with a main frame having upright members, of a substantially U-shaped upright frame reversibly connected to the upright members so it may be turned upside down, and a draft-pole connected to the U-shaped frame.

8. In a cultivator, the combination with a main frame having upright members, of a substantially U-shaped upright frame, a slot-and-bolt connection between the upright members and the U-shaped frame, and a draft-pole connected to the U-shaped frame.

9. In a cultivator, the combination with a main frame, of substantially horizontal cultivator-beams movable vertically as an entirety and pivoted to the main frame intermediate their ends and independently swingingly adjustable laterally toward and away from each other, means for independently swinging said beams laterally, and means for raising and lowering said beams.

In testimony whereof I hereunto affix my signature in presence of two witnesses.

SIDNEY PENNINGTON STOVALL.

Witnesses:
 M. O. DICK,
 MALCOLM LINDSEY.